H. WEIDA.
HARD RUBBER BATTERY JAR AND PROCESS OF MANUFACTURING SAME.
APPLICATION FILED NOV. 3, 1916.
1,256,750.
Patented Feb. 19, 1918.
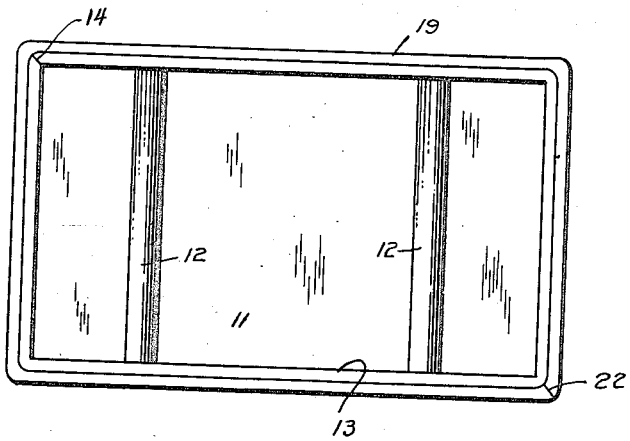
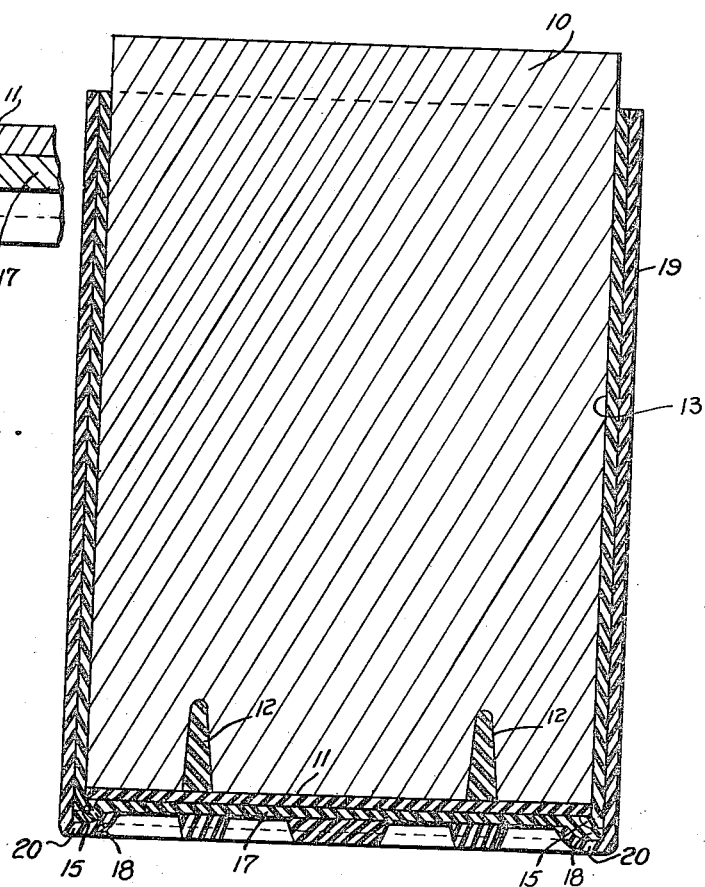
Attest:
S. G. Taylor.
Inventor:
Harry Weida,
by Ernest Hopkinson
his Atty

UNITED STATES PATENT OFFICE.

HARRY WEIDA, OF HIGHLAND PARK, NEW JERSEY, ASSIGNOR TO THE INDIA RUBBER COMPANY, A CORPORATION OF NEW JERSEY.

HARD-RUBBER BATTERY-JAR AND PROCESS OF MANUFACTURING SAME.

1,256,750.

Specification of Letters Patent.　　Patented Feb. 19, 1918.

Application filed November 3, 1916.　Serial No. 129,269.

*To all whom it may concern:*

Be it known that I, HARRY WEIDA, a citizen of the United States, residing at Highland Park, in the county of Middlesex, State of New Jersey, have invented certain new and useful Improvements in Hard-Rubber Battery-Jars and Processes of Manufacturing Same, of which the following is a full, clear, and exact description.

This invention relates to battery jars formed of hard rubber composition, that is, of rubber suitably compounded to partake of a hard consistency during cure. The present invention provides a process which produces strong tight joints in the battery jar so that the leaks which have hitherto developed during manufacture and in service will be positively prevented.

The invention can be readily understood from the following description taken in connection with the accompanying drawing in which:

Figure 1 is a longitudinal sectional view of a core and jar built thereon in accordance with the present invention.

Fig. 2 is a plan view of the jar.

Fig. 3 is an enlarged detail view showing how the present invention remedies defects.

During inspection after cure, a large per cent. of the hard rubber battery jars manufactured by ordinary processes is found defective because of leaky joints, and a large per cent. develop leaks during service. These defective jars, of course, are worthless and are scrapped. This waste is unavoidable and results from two causes. Hard rubber composition in an unvulcanized state, unlike rubber compounded to be elastic after cure, has a putty-like consistency rendering it more or less unadhesive, and this lack of adhesiveness makes it difficult for the workman to make a tight joint. At places, spaces exist where the rubber sheets, of which the jar is formed, have resisted the efforts of the operator to unite them, especially at the seams or joints, and these harden into circuitous passage ways or leaks during open steam cure. Moreover, dust and small fibers accumulate on the sheets during handling of the same, and prevent their contact at the joints, and consequently additional leaks develop in service due to the acid eating through the foreign substances.

In carrying out the present invention, I superpose sheets of hard rubber composition upon each other upon a core in such a manner that the ends of the sheets at the edges and corners of the bottom of the core interfit, while the joined ends of each of the superposed sheets on the sides of the core are out of register with each other. As a result, should some of the contiguous sheets at the joints remain ununited at places, there will be other sheets that pass with uninterrupted continuity over and seal such circuitous passage ways as may thus unavoidably occur. Moreover, the probability of foreign substances being in register at an identical place on each of the sheets is so slight as to be negligible, so that acid eating through any foreign substances will at length come to a rubber seal, and thus leaks in service will be prevented.

In Fig. 1 I have shown at 10, a core of the usual and well known type upon which hard rubber battery jars are built and cured. Upon the bottom of this core 10, a sheet 11 of hard rubber composition is placed to form the bottom of the jar, but prior to this, rubber masses sufficient to form the cleats 12, which support the plates of the battery jar, are forced into corresponding recesses of the core. Next a sheet 13 of hard rubber composition is wrapped in a single layer around the sides of the core, to form the wall of the jar. The ends of the sheet, which are beveled, are united and a butt joint 14 made longitudinally on the side of the core. The lower edge portion of the sheet, which extends below the bottom 11, is now lapped inwardly upon the bottom sheet 11, shown at 15, and forms a lap joint on the bottom of the jar.

Should the jar be vulcanized at this stage, there might remain places where the contiguous sheets had resisted the efforts of the operator to unite them, and circuitous passage ways or leaks, such for instance as shown at 16 in Fig. 3, would be formed and necessitate scrapping of the product because of this defect. To overcome this I superpose other sheets of hard rubber composition upon the first laid sheets in such a manner that wherever there might exist leaks a hard rubber seal will exist and close the leak, as will now be described.

A sheet 17 of hard rubber composition is superposed upon the bottom sheet 11, the sheet 17 being of sufficient length and breadth to marginally overlap the lapped over portion 15 of the sheet 13 as shown at 18, and thus extend with uninterrupted continuity past the edge of said lapped over portion and effectively seal any crevices such as shown at 16 between the opposing faces of the sheet 11 and lapped over portion 15 of the sheet 13. As a still further precaution, to seal any leaks which might even now remain between the interfitting sheets 11, 15, and 18, I superpose a sheet 19 of hard rubber composition upon the sheet 13, and bend the lower edge portion 20 inwardly upon the marginal portion 18 of the sheet 17. Thus the sheet 19 passes with uninterrupted continuity past the edge of said marginal portion 18 and effectively seals any crevices such as shown at 21 between the opposing faces of said portion 18 and the bent over portion 15 of the sheet 13. It will thus be noted that by interfitting the various superposed sheets together at the edges and corners of the bottom of the core, all danger of leaks at the bottom of the jar is positively prevented.

The ends of the sheet 19 are beveled and form a butt joint 22 on the side of the jar, and I so position this sheet upon the first applied sheet 13, that the joint 22 will be out of register with the joint 14, and preferably will come diametrically opposite the joint 14. Thus the sheet 19 passes with uninterrupted continuity past the joint 14 and seals any leaks that may occur at this joint.

To complete the process the jar thus built and supported upon the core is put in a vulcanizer and cured in open steam. During cure, the various rubber sheets merge at their contacting faces and form a unitary integral structure.

Having thus described my invention, what I claim as new and desire to protect by Letters Patent is:

1. A container of the character described, comprising a bottom formed of superimposed sheets of vulcanized rubber, and a side wall embodying therein a sheet of vulcanized rubber having the lower edge thereof disposed between the marginal edges of adjoining sheets forming said bottom.

2. A container of the character described, comprising a bottom formed of two superimposed sheets of vulcanized rubber, and a side wall embodying therein a sheet of vulcanized rubber having the lower edge thereof disposed between the marginal edges of said sheets forming said bottom, the upper of said sheets forming said bottom abutting against said side wall.

3. A container of the character described, embodying therein a bottom formed of two superimposed sheets of vulcanized rubber, and a side wall composed of an inner sheet of vulcanized rubber having the lower edge thereof disposed between the marginal edges of the sheets forming said bottom, and an outer sheet of vulcanized rubber having the lower edge thereof turned inwardly below the marginal edge of the lower sheet of said bottom and upwardly against said lower sheet.

4. A container of the character described, embodying therein a bottom formed of two superimposed sheets of vulcanized rubber, and a side wall composed of an inner sheet of vulcanized rubber having the lower edge thereof disposed between the marginal edge of the sheets forming said bottom, and an outer sheet of vulcanized rubber having the lower edge thereof turned inwardly below the marginal edge of the lower sheet of said bottom and upwardly against said lower sheet, the dimensions of the lower sheet forming the bottom being relatively greater than the dimensions of the upper sheet forming said bottom, whereby said lower sheet will project into engagement with the outer side wall sheet.

5. The herein described process of manufacturing hard rubber battery jars consisting in positioning a sheet of vulcanizable rubber composition upon the bottom of a core, wrapping a sheet of vulcanizable rubber composition about said core to form the side walls of a jar, turning the lower edge thereof inwardly upon said first-named sheet, superimposing another sheet of rubber upon said first-named sheet and the inturned edge of said other sheet, and vulcanizing the built-up structure.

6. The herein described process of manufacturing hard rubber battery jars consisting in positioning a sheet of vulcanizable rubber composition upon the bottom of a core, wrapping a sheet of vulcanizable rubber composition about said core to form an inner portion of the side walls of a jar, turning the lower edge thereof inwardly upon said first-named sheet, superimposing another sheet of rubber upon said first-named sheet and the inturned edge of said other sheet, superimposing an outer sheet of vulcanizable rubber forming an outer portion of the side walls of the jar, turning the lower edge of said outer sheet inwardly and upwardly, and vulcanizing the built-up structure.

Signed at New Brunswick, N. J., this 26th day of October, 1916.

HARRY WEIDA.